(12) United States Patent
Tsai et al.

(10) Patent No.: US 8,492,646 B2
(45) Date of Patent: Jul. 23, 2013

(54) ELECTROLYTE COMPOSITION

(75) Inventors: An-I Tsai, Kaohsiung (TW);
Shinn-Horng Chen, Kaohsiung (TW)

(73) Assignee: Eternal Chemical Co., Ltd., Koahsiung (TW)

( * ) Notice: Subject to any disclaimer, the term of this patent is extended or adjusted under 35 U.S.C. 154(b) by 403 days.

(21) Appl. No.: 12/792,469

(22) Filed: Jun. 2, 2010

(65) Prior Publication Data
US 2010/0308254 A1 Dec. 9, 2010

(30) Foreign Application Priority Data

Jun. 3, 2009 (TW) .............................. 98118445 A

(51) Int. Cl.
*H01L 31/0256* (2006.01)
(52) U.S. Cl.
USPC ............ 136/252; 136/265; 136/264; 136/263

(58) Field of Classification Search
USPC .................................. 136/252, 265, 264, 263
See application file for complete search history.

(56) References Cited

U.S. PATENT DOCUMENTS

| 2004/0200991 | A1 | 10/2004 | Chu |
| 2007/0125422 | A1 | 6/2007 | Hammami |
| 2007/0269923 | A1 | 11/2007 | Lee |
| 2008/0115831 | A1 * | 5/2008 | Kang et al. ..................... 136/263 |

FOREIGN PATENT DOCUMENTS

| TW | 200706590 | 6/1995 |
| TW | 558563 B | 10/2003 |
| WO | 2007010712 A1 | 1/2007 |

* cited by examiner

*Primary Examiner* — Carol M Koslow
(74) *Attorney, Agent, or Firm* — Sughrue Mion, PLLC

(57) ABSTRACT

The invention relates to an electrolyte composition, comprising a polyether polymer, a polyethylene oxide, and a redox pair and optionally nano-particles.

14 Claims, No Drawings

ELECTROLYTE COMPOSITION

FIELD OF THE INVENTION

This invention relates to an electrolyte composition; in particular, an electrolyte composition used in a dye sensitized solar cell (DSSC) as a solid electrolyte.

BACKGROUND OF THE INVENTION

When addressing the issues of pollution, limited energy supply, and carbon emissions faced by conventional petrochemical industries, solar is one of the most sought-after sources of alternative renewable, non-toxic energy. For this reason, development of improved solar cell technology to transform solar energy into electricity has become a common pursuit of research and development.

The dye sensitized solar cell (DSSC) has particular advantages of being permeable to light, flexible, easily processed, and inexpensive, as well as possessing a large active area and so is more economically efficient than silicon solar cells. Normally, a dye sensitized solar cell includes four parts: anode/cathode electrodes for providing path for current, a semiconductor material (such as titanium oxide), a dye layer, and an electrolyte for transferring electron holes. The material of each part mentioned above and the interface structure between them all may affect the efficiency of the cell.

At present, liquid state electrolytes are commonly used in the industry but have the disadvantages of being volatile, unstable, and difficult to package. Therefore, an electrolyte in solid or gel state is developed to address the issue of instability. However, solid state electrolytes have their own problems. For example, it is difficult for the electrolyte to penetrate into titanium oxide, and the ion diffusion rate is slow, leading to low conductivity.

Therefore, there is a demand in this technical field to develop a solid electrolyte resolving the above issues.

SUMMARY OF THE INVENTION

An aim of the invention is to provide an electrolyte composition, comprising polyethylene oxide, polyether polymer, and a redox pair.

DETAILED DESCRIPTION OF THE INVENTION

An electrolyte composition according to the invention comprises a) polyethylene oxide (PEO), b) polyether polymer, and c) a redox pair.

Polyethylene oxide is a linear crystalline polymer, including a high electronegative element such as oxygen on the main chain to produce polar bonding to help dissociation of salts. Ions bond with the polymers by forming ionic bonding. Ionic bonding is a reversible, primary valance force. Therefore, ions can transfer with the movement of the polymer chain. However, since ions can only transfer on the more flexible ether (—O—) chain and are restricted in the polymer non-crystalline region, the ion diffusion rate will be very low (leading to low conductivity) if polyethylene oxide is the only base material for electrolyte and therefore the need of industry cannot be satisfied. Thus, the present invention utilizes polyether polymer to mix with polyethylene oxide as a base material to provide more ether (—O—) chains and to disturb the order of the arrangement of the polyethylene oxide so that the extent of the crystalline polyethylene oxide can be decreased and the ion diffusion rate can be higher (leading to an increase of the conductivity). The ratio of a) polyethylene oxide to b) polyether polymer in the electrolyte composition of the invention is 0.2:1 to 3:1 by weight, preferably 0.5:1 to 2:1 by weight, and more preferably 0.7:1 to 1.5:1 by weight. When the weight ratio of polyethylene oxide to polyether polymer is lower than 0.2, the amount of the electronegative elements is lower, leading to a low dissociation of salts and low conductivity. In addition, when the weight ratio of polyethylene oxide to polyether polymer is higher than 3, polyethylene oxide crystallizes easily and ions cannot transfer in the crystalline region, also leading to low conductivity.

Polyethylene oxide applied in the present invention should have a purity of more than 90%, and an average molecular weight in a range of 500,000 to 8,000,000, preferably a range of 4,000,000 to 5,000,000.

In one embodiment, the polyether polymer of the invention is polyether urethane with the formula (I),

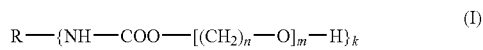

$$R\text{---}\{NH\text{---}COO\text{---}[(CH_2)_n\text{---}O]_m\text{---}H\}_k \qquad (I)$$

wherein R is aryl or $C_{3-6}$cycloalkyl; n is an integer of 2 to 4; m is an integer of 6 to 100, preferably an integer of 6 to 50, and more preferably an integer of 6 to 15; and k is an integer of 2 to 4.

According to one preferred embodiment, when R of formula (I) is tolyl and k is 2, the polyether polymer has the following formula ($I_1$),

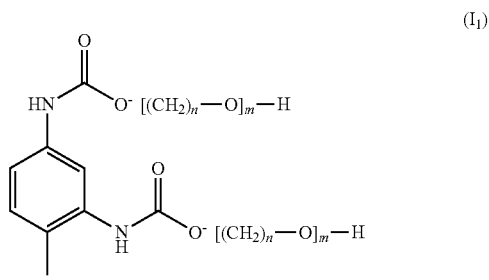

wherein n and m are defined as above.

According to one most preferred embodiment, R of formula (I) is tolyl, n is 2, m is an integer of 6 to 50, and k is 2.

The polyether urethane of the invention can be obtained by any methods known to the persons having ordinary skill in the art, for example, by polymerizing a hydroxyl containing compound with an isocyanate containing compound. The mole ratio of the hydroxyl containing compound to the isocyanate containing compound is 0.8 to 4.0, preferably 0.8 to 2.0, and more preferably 0.8 to 1.5.

According to the invention, the isocyanate containing compound can contain one or more isocyanate groups or a mixture of compounds with different amounts of isocyanate groups. The isocyanate containing compound can be selected from the group consisting of toluene diisocyanate (TDI), methylenediphenylene diisocyanate (MDI), isophoronediisocyanate (IPDI), dicyclohexanemethylene diisocyanate, xylene diisocyanate, and hydrogenated xylene diisocyanate. Preference is TDI.

The hydroxyl containing compound mentioned above can contain one or more hydroxyl groups or can be a mixture of the compounds with different amounts of hydroxyl groups. For example, the hydroxyl containing compound can be selected from the group consisting of polyethylene glycol (PEG), polypropylene glycol (PPG), and polytetramethylene glycol (PTMG). Preference is PEG.

In another embodiment, the polyether polymer of the invention is a phosphorous containing polyether, having a formula of (II),

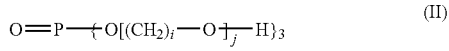

$$O=P-\{O[(CH_2)_i-O]_j-H\}_3 \quad (II)$$

wherein i is an integer of 2 to 4; j is an integer of 6 to 100, preferably an integer of 6 to 50, and more preferably an integer of 6 to 15. According to one preferred embodiment, i of formula (II) is 2 and j is an integer of 6 to 50.

According to the invention, the phosphorus containing polyether can be obtained by polymerizing a hydroxyl containing compound with phosphoryl chloride, wherein the mole ratio of the hydroxyl containing compound to phosphoryl chloride is 0.8 to 3, and preferably 0.9 to 1.9. The hydroxyl containing compound is as described hereinbefore.

There is no limitation as to the redox pair used in a dye sensitized solar cell as long as the energy level of the redox pair can match the highest occupied molecular orbital (HOMO) of the dye. For example, the redox pair can be but is not limited to $I_3^-/I^-$, $Br^-/Br_2$, $SCN^-/(SCN)_2$ or $SeCN^-/(SeCN)_2$. Among them, $I_3^-/I^-$ is preferred as a redox pair because the diffusion rate of iodine ion is higher.

To increase conductivity and strength, the electrolyte composition can further include nano-particles. By adding nano-particles, the crystallinity of the polyethylene oxide can be disturbed and then the non-crystalline region can be increased to form an ion channel, thereby increasing the conductivity of the solid electrolyte. On the other hand, the hardness of the nano-particles is helpful in increasing the mechanical strength of the solid electrolyte. There is no limitation to the species of the nano-particles of the invention. For example, the nano-particles can be selected from the group consisting of silicon dioxide, aluminum oxide, cadmium sulfide, zirconium oxide, calcium phosphate, calcium oxide, titanium dioxide, and zinc oxide. Preferably, silicon oxide, titanium dioxide, or their mixture is selected. More preferably, silicon dioxide is selected. The nano-particles can be used in an amount of 0.5 parts by weight to 5 parts by weight, and preferably 0.5 parts by weight to 3 parts by weight based on 100 parts by weight of the total amount of (a) polyethylene oxide and (b) polyether polymer of the electrolyte composition. In general, the diameter of the nano-particles is about 1 to 50 nm.

In addition, the electrolyte composition of the present invention can optionally have an additive known in the art, such as an additive used for modifying the properties of the nano-particles and improving the efficiency of the cell. In general, the additive can be selected from the group consisting of 4-tert-butylpyridine (TBP), N-methyl-benzimidazole (MBI), 1,2-dimethyl-3-propylimidazolium iodide (DMP II), lithium iodide, and sodium iodide. When lithium iodide or sodium iodide is added to the electrolyte, the lithium ion ($Li^+$) or sodium ion ($Na^+$) will adsorb to the surface of the semiconductor material (such as titanium dioxide). The adsorbed $Li^+$ can form $Li^+$-$e^-$ with the electron in conduction band. Since $Li^+$-$e^-$ can transfer on the surface of the titanium dioxide and leave the surface of the titanium dioxide to transfer, the resistance and distance between adjacent or non-adjacent titanium dioxides for transferring the electrons in the conduc tion band can be shortened, leading to an improvement of the transfer of the electrons on the surface of the titanium dioxide and an increase of the short-circuit current (Jsc). But, at the same time, the rate of $Li^+$-$e^-$ recombining with $I_3^-$ of the electrolyte will also be increased, resulting in a decrease of the voltage (Voc). Moreover, addition of 4-tert-butylpyridine, N-methyl-benzimidazole, or 1,2-dimethyl-3-propylimidazolium iodide can increase the Fermi level between the lowest unoccupied molecular orbital (LUMO) of the dye and the conduction band of the titanium dioxide, resulting in an increase of the voltage of the cell. Therefore, depending on the performance of the cell, it may be necessary to add one, two, or more additives.

The process of preparing an electrolyte composition of the invention includes, for example, mixing the polyethylene oxide as described above with the polyether polymer as described above to form a base material of the electrolyte composition, then adding a redox system which is capable of generating a redox pair to the composition, optionally adding nano-particles and additive to the composition, and mixing it uniformly, thereby obtaining an electrolyte composition which has better conductivity and/or mechanical strength and is suitable in a dye sensitized solar cell as a solid electrolyte.

According to the preferred embodiment of the invention, the process of preparing a solid electrolyte of a solar cell from the electrolyte composition of the invention includes the following steps:

(a) distributing the polyether polymer in a first solvent to form a first solution;
(b) dissolving polyethylene oxide in a second solvent to form a second solution;
(c) mixing the first solution with the second solution to form a third solution;
(d) adding a redox system (such as $LiI/I_2$) which can generate a redox pair to the resulting third solution and optionally adding nano-particles and/or additive to it and then mixing it uniformly to form a fourth solution; and
(e) slowly, dropwise adding the fourth solution on the surface of the working electrode and waiting for a period of time to allow the solution to penetrate into the holes of the semiconductor material to improve the transfer efficiency of the electrons and holes, and then carrying out a low temperature drying process to remove the solvent residue after the penetration is completed.

The first solvent of step (a) of the above process is not limited, and can be selected from the group consisting of tetrahydrofuran (THF), ethanol, acetone, diethyl ether, acetonitrile, dichloromethane, hexane, and ethyl acetate. Preference is THF.

The second solvent of step (b) of the above process can be selected from the group consisting of tetrahydrofuran (THF), ethanol, acetone, diethyl ether, acetonitrile, dichloromethane, hexane, and ethyl acetate. Preference is acetonitrile.

The process of preparing a working electrode of step (e) includes, for example, coating a semiconductor material (such as titanium dioxide) on the surface of a conducting substrate to form a thin film, sintering it at a high temperature (400° C. to 600° C.) and then dipping it into a dye to form a working electrode.

The present invention is further defined in the following example(s). It should be understood that the example(s), while indicating preferred embodiments of the inventions, are given by way of illustration only. From the above discussion and the example(s), one skilled in the art can ascertain the essential characteristics of this invention and, without departing from the spirit and scope thereof, can make various changes and modifications to the invention to adapt it to various uses and conditions.

EXAMPLES

Preparation of Polyether Polymer

1. Polyether urethane: polyethylene glycol (Mw: 400) was heated and baked to remove water. 1 mole of polyethylene glycol and 1 mole of toluene diisocyanate were reacted under a nitrogen environment for two hours to polymerize and then polyether urethane was obtained.
2. Phosphorus containing polyether: polyethylene glycol was heated and baked to remove water and then was added phosphoryl chloride ($POCl_3$) (the mole ratio of $POCl_3$ to PEG is 1:2) and mixed for 1 hour at 60° C. to polymerize and then phosphorus containing polyether was obtained.

The electrolyte compositions used for the solid electrolyte of the dye sensitized solar cell were prepared according to the compositions shown in Table 1.

Preparation of Electrolyte Composition

1. Preparation of first solution: polyether urethane or phosphorus containing polyether was placed in a sample bottle, tetrahydrofuran was added, and the solution was mixed thoroughly.
2. Preparation of second solution: polyethylene oxide (Mw: 4,000,000) was placed in the sample bottle, and acetonitrile was added and mixed until fully dissolved.
3. The first solution and the second solution were mixed thoroughly to form a third solution.
4. Lithium iodide/iodine ($LiI/I_2$) was added to the third solution, which was then mixed at room temperature until dissolved and optionally silicon dioxide nano-particles (7 nm) and/or additive was added and mixed to form a fourth solution.

Preparation of Solar Cell

A titanium dioxide slurry was coated on a treated conductive glass and then the coated glass was dipped into a dye (N719, a product made by Solaronix company) after being heated at a high temperature for 14 to 24 hours to form a working electrode of a cell. The resulting electrolyte composition was slowly, dropwise added on the surface of the working electrode. The working electrode was then left to stand for a period of time to allow the solution to penetrate slowly and then was cool dried. A platinum plated counter electrode was placed on the resulting electrode. The working electrode and the counter electrode were fixed by a fixing element or sealant gel, and then placed in an oven at 40° C. and vacuumed. After drying for 24 hours, a dye sensitized solar cell was obtained.

Solar Cell Property Test

The working electrode and the counter electrode of the cell were wired respectively to a cell property test device. A sun light simulator was used to produce a light with intensity of 100 mW/cm² for testing the cell. The test results are shown in Table 2.

TABLE 1

| Examples | Polyether urethane | Phosphorus containing polyether | PEO | $LiI/I_2$ | $SiO_2$ |
|---|---|---|---|---|---|
| 1 | 0.088 g | | 0.176 g | 0.1 g/0.018 g | — |
| 2 | 0.132 g | | 0.132 g | 0.1 g/0.018 g | — |
| 3 | 0.176 g | | 0.088 g | 0.1 g/0.018 g | — |
| 4 | 0.088 g | | 0.176 g | 0.1 g/0.018 g | 0.0038 g |
| 5 | 0.132 g | | 0.132 g | 0.1 g/0.018 g | 0.0038 g |
| 6 | 0.176 g | | 0.088 g | 0.1 g/0.018 g | 0.0038 g |
| 7 | 0.132 g | | 0.132 g | 0.1 g/0.018 g | 0.0019 g |
| 8 | 0.132 g | | 0.132 g | 0.1 g/0.018 g | 0.0076 g |
| 9 | | 0.176 g | 0.088 g | 0.1 g/0.018 g | |
| 10 | | 0.088 g | 0.176 g | 0.1 g/0.018 g | 0.0038 g |
| 11 | | 0.132 g | 0.132 g | 0.1 g/0.018 g | 0.0038 g |
| 12 | | 0.176 g | 0.088 g | 0.1 g/0.018 g | 0.0038 g |

TABLE 2

| Examples | Jmpp | Vmpp | Open circuit voltage (mV) | Short circuit density (mA/cm²) | Filling factor | Light conversion efficiency (%) |
|---|---|---|---|---|---|---|
| 1 | 3.22 | 0.50 | 0.66 | 3.89 | 0.63 | 1.61 |
| 2 | 6.69 | 0.48 | 0.74 | 8.25 | 0.53 | 3.21 |
| 3 | 3.28 | 0.38 | 0.54 | 3.78 | 0.61 | 1.25 |
| 4 | 6.20 | 0.50 | 0.70 | 7.07 | 0.63 | 3.10 |
| 5 | 8.02 | 0.40 | 0.64 | 11.21 | 0.45 | 3.21 |
| 6 | 7.19 | 0.36 | 0.58 | 9.48 | 0.47 | 2.89 |
| 7 | 7.15 | 0.44 | 0.68 | 8.88 | 0.52 | 3.14 |
| 8 | 3.39 | 0.48 | 0.66 | 4.28 | 0.58 | 1.63 |
| 9 | 3.08 | 0.46 | 0.60 | 3.78 | 0.62 | 1.42 |
| 10 | 4.28 | 0.24 | 0.36 | 5.32 | 0.54 | 1.03 |
| 11 | 4.04 | 0.46 | 0.62 | 4.77 | 0.63 | 1.86 |
| 12 | 4.06 | 0.26 | 0.42 | 5.31 | 0.47 | 1.06 |

What is claimed is:

1. An electrolyte composition, comprising:

(a) polyethylene oxide;

(b) polyether polymer; and (c) a redox pair, wherein the polyether polymer is selected from the group consisting of a polyether urethane having a structure of the following formula (I) and a phosphorus-containing polyether having a structure of the following formula (II):

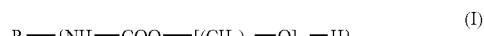

(I)   R—{NH—COO—[(CH$_2$)$_n$—O]$_m$—H}$_k$ wherein R is aryl or $C_{3-6}$ cycloalkyl, n is an integer of 2 to 4, m is an integer of 6 to 100, and k is an integer of 2 to 4; and

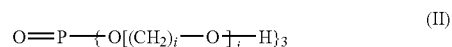

(II)   O═P—{O[(CH$_2$)$_i$—O]$_j$—H}$_3$ wherein i is an integer of 2 to 4, and j is an integer of 6 to 100.

2. The electrolyte composition of claim 1, wherein k is 2, and the polyether urethane has a structure of formula ($I_1$):

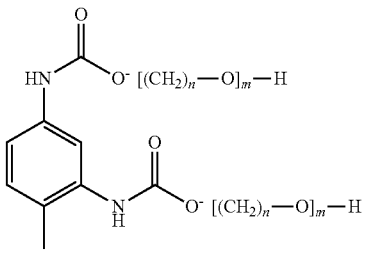

wherein n is an integer of 2 to 4, and m is an integer of 6 to 100.

3. The electrolyte composition of claim 2, wherein m is an integer of 6 to 50.

4. The electrolyte composition of claim 2, wherein n is 2.

5. The electrolyte composition of claim 1, wherein j is an integer of 6 to 50.

6. The electrolyte composition of claim 1, further comprising nano-particles.

7. The electrolyte composition of claim 6, wherein the nano-particles are selected from the group consisting of silicon dioxide, aluminum oxide, cadmium sulfide, zirconium oxide, calcium phosphate, calcium oxide, titanium dioxide, and zinc oxide.

8. The electrolyte composition of claim 7, wherein the nano-particles are silicon oxide, titanium dioxide, or a mixture thereof.

9. The electrolyte composition of claim 7, wherein the nano-particles are silicon oxide.

10. The electrolyte composition of claim 6, wherein the nano-particles have a diameter of about 1 to 50 nm.

11. The electrolyte composition of claim 1, wherein the weight ratio of the polyethylene oxide to the polyether polymer is 0.2:1 to 3:1.

12. The electrolyte composition of claim 1, wherein the weight ratio of the polyethylene oxide to the polyether polymer is 0.5:1 to 2:1.

13. The electrolyte composition of claim 1, wherein the redox pair is $I_3^-/I^-$, $Br^-/Br_2$, $SCN^-/(SCN)_2$, or $SeCN^-/(SeCN)_2$.

14. The electrolyte composition of claim 13, wherein the redox pair is $I_3^-/I^-$.

* * * * *